United States Patent
Craig, Jr.

(10) Patent No.: US 6,243,924 B1
(45) Date of Patent: Jun. 12, 2001

(54) REINFORCING ARRANGEMENT IN A PLASTICALLY DEFORMABLE EAR FOR A HOSE CLAMP

(76) Inventor: Paul M. Craig, Jr., 207 Quaint Acres Dr., Silver Spring, MD (US) 20904

(*) Notice: Subject to any disclaimer, the term of this patent is extended or adjusted under 35 U.S.C. 154(b) by 0 days.

(21) Appl. No.: 09/689,624

(22) Filed: Oct. 13, 2000

Related U.S. Application Data

(60) Provisional application No. 60/208,035, filed on May 31, 2000.

(51) Int. Cl.[7] .................................................. F16L 33/02
(52) U.S. Cl. ........................................ 24/20 R; 24/20 CW
(58) Field of Search ................................ 24/20 R, 20 CW, 24/20 TT, 23 W, 20 W, 23 R, 20 EE

(56) References Cited

U.S. PATENT DOCUMENTS

| | | | | |
|---|---|---|---|---|
| 5,282,295 | * | 2/1994 | Oetiker | 24/20 R |
| 5,339,496 | * | 8/1994 | Oetiker | 24/20 R X |

* cited by examiner

Primary Examiner—James R. Brittain

(57) ABSTRACT

A reinforcing arrangement in the bridging portion of a plastically deformable ear which defines the outlines resembling a four-sided diamond.

26 Claims, 3 Drawing Sheets

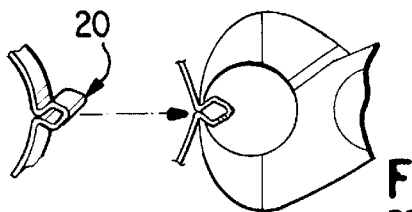
FIG. 1
PRIOR ART
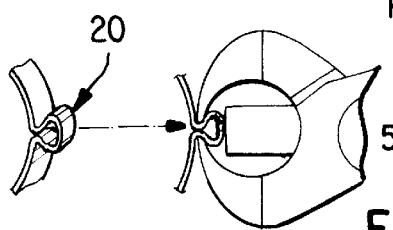
FIG. 2
PRIOR ART
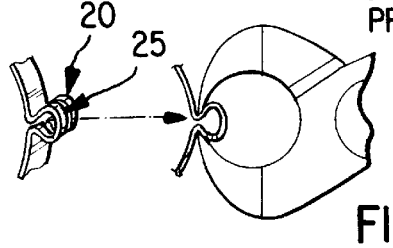
FIG. 3
PRIOR ART
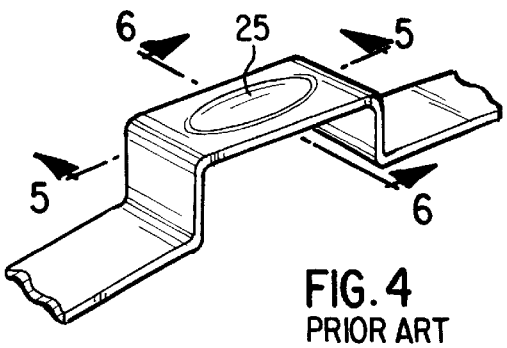
FIG. 4
PRIOR ART
FIG. 5
PRIOR ART
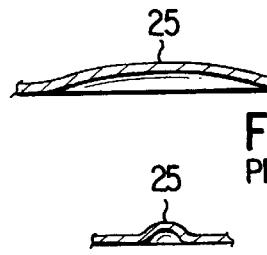
FIG. 6
PRIOR ART
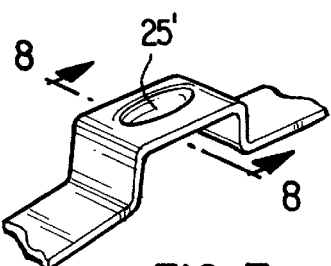
FIG. 7
PRIOR ART
FIG. 8
PRIOR ART
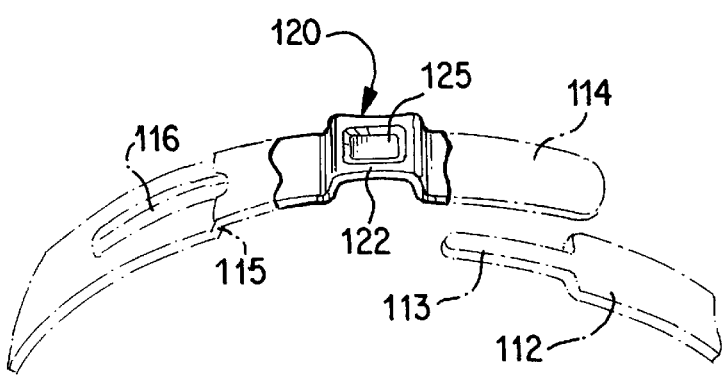
FIG. 9
PRIOR ART

REINFORCING ARRANGEMENT IN A PLASTICALLY DEFORMABLE EAR FOR A HOSE CLAMP

This application claims the benefit of U.S. Provisional Application No. 60/208,035 filed May 31, 2000.

FIELD OF THE INVENTION

The present invention relates to hose clamps, and more particularly to the reinforcement in the bridging portion of a so-called "Oetiker" ear.

BACKGROUND OF THE INVENTION

Hose clamps with so-called "Oetiker" ears consisting of two generally outwardly extending leg portions interconnected by a bridging portion have enjoyed immense commercial success since almost five decades ago. These clamps originally included two ears and were made from tubular stock (U.S. Pat. No. 2,614,304). With the use of improved manufacturing techniques assuring better dimensional controls of the hose materials, clamps with only one ear became a practical reality. Additionally, clamps also were made from clamping band material of galvanized steel and stainless steel (U.S. Pat. No. 3,082,495). However, problems arose, especially when using thinner clamping band materials in the ability to properly realize the desired omega shape of the ear upon plastic deformation thereof with conventional pincer tools. More specifically, as disclosed in U.S. Pat. No. 3,402,436, in lieu of deforming into a more or less omega shape upon plastic deformation, the ears generally designated by reference numeral 20 in FIG. 1 of this application had a tendency to buckle as illustrated in this figure. Special tools with a hold-down member 50 (FIG. 2) were developed to counteract this tendency. Apart from the cost factor, the need for special tools detracted from the universal appeal of such hose clamps. As also disclosed in U.S. Pat. No. 3,402,436, the tendency to buckle was eliminated by the use of one or more reinforcing grooves 25 in the bridging portion of the "Oetiker" ear. These reinforcing grooves could be either in the form of pressed-out, deep-drawn embossments 25 (FIGS. 4–6) or in the form of pressed-out, deep-drawn indentations 25' (FIGS. 7 and 8). These reinforcements 25 and 25' were normally in the form of a narrow groove resembling the shape of a canoe with a pronounced curved bottom. As new hose materials became available which were made from thinner and much harder plastic materials and as the demands made of hose clamps also changed therewith, a new reinforcing arrangement of the bridging portion came into being as disclosed in U.S. Pat. No. 5,282,295. The improved reinforcement generally designated by reference numeral 125 in the bridging portion 122 of the ear generally designated by reference numeral 120 (FIGS. 9–12) had a relatively shallow pan-shaped depression including a generally flat bottom part 126 as well as longitudinal and transverse connecting portions 127 and 128 connecting the bottom part 126 with the remaining non-depressed bridging portion 122. The area of the bottom part was specified in this patent to be at least 35% of the original area of the non-reinforced bridging portion, and preferably between about 40% to about 60% thereof. This prior art reinforcing arrangement for the bridging portion has also proved commercially highly successful. However, because of material needs in the formation of the depression 125, the sides of this prior art bridging portion become curved concavely as also disclosed in this patent. Additionally, an important feature of the so-called "Oetiker" ears resides in the automatic compensation in case of thermal or pressure variations in the hose. This feature is due to the elastic behavior caused by stresses set up in the ear during plastic deformation which resist and compensate for changes in the shape of the plastically deformed ear. The plastically deformed "Oetiker" ear thereby compensates also for aging of the hose material in that it seeks to maintain the original clamping pressure as the external diameter of the hose decreases due to aging. It is therefore desirable to limit the anti-buckling reinforcing areas as much as possible to areas other than areas where compensating stresses are set up during plastic deformation of the normal flat band material including the areas of the connections between the bridging portion and the leg portions.

BRIEF DESCRIPTION OF THE INVENTION

This invention is predicated on the recognition that the anti-buckling requirement of an "Oetiker" ear conflicts with the desire to utilize as much of the original flat band material as possible in the plastic deformation of the ear to optimize the so-called "breathing" ability of the ear, i.e., to compensate for increases or decreases of the outside dimensions of the hose. Furthermore, the invention also seeks to minimize the concave curvature in the sides of the bridging portion which causes a reduction of the area of the bridging portion where maximum resistance to buckling is desired, i.e., in the longitudinal center area of the bridging portion.

These drawbacks are avoided according to this invention in that the reinforcing arrangement in the bridging portion of the "Oetiker" ear defines the outline of a shape resembling a four-sided diamond. This configuration which is widest in the center area of the reinforcement thereby offers maximum resistance to buckling in the area where most needed. On the other hand, it provides additional material for the plastic deformation in other needed areas such as, for example along the sides of the bridging portion and in the areas where the leg portions are connected with the bridging portion. It makes available material to minimize the tendency of concavely curved constrictions in the sides of the bridging portion.

According to another feature of this invention, the resistance to buckling may be increased in the area where most needed, by an additional narrow groove-shaped reinforcing recess extending longitudinally substantially in the center area of the depression in the bridging portion and of a length equal to but preferably smaller than the maximum longitudinal extent of the bottom of the approximately diamond-shaped reinforcing recess. If the width of the clamping band permits, this groove-shaped reinforcing recess may be adjoined on each side in the transverse direction of the clamping band by one or more narrow groove-shaped reinforcing recesses which decrease in overall length away from the center longitudinal plane of the bridging portion to thereby conform to the outline of the diamond-shaped configuration.

According to still another feature of this invention, the approximately diamond-shaped recess may be omitted altogether with certain materials and with a sufficient width of the clamping band and may be replaced by substantially longitudinally extending narrow groove-shaped reinforcing recesses of ever-decreasing length away from the center longitudinal plane of the bridging portion which again conform to the outline of an approximately diamond-shaped configuration.

The term "recess" in this application is used to describe both inwardly and outwardly deep-drawn, pressed-out shapes, i.e., both deep-drawn, pressed-out indentations and embossments.

BRIEF DESCRIPTION OF THE DRAWINGS

These and further objects, features and advantages of the present invention will become more apparent from the following description when taken in conjunction with the accompanying drawings which show, for purposes of illustration only, several embodiments in accordance with the present invention, and wherein:

FIG. 1 is a partial perspective view illustrating the tendency of an ear generally designated by reference numeral 20 to buckle when plastically deformed by a so-called pincer tool;

FIG. 2 is a view similar to FIG. 1 and illustrating the realization of the desired approximately omega shape of the ear generally designated by reference numeral 20 with the use of a special pincer-like tool having a centrally arranged hold-down member 50 which moves toward the ear as the jaws are closed;

FIG. 3 is a view similar to FIGS. 1 and 2 and illustrating the ability to obtain the desired omega shape of the ear 20 by providing a reinforcing groove 25 in the bridging portion;

FIG. 4 is a perspective view, on an enlarged scale, illustrating the reinforcing groove generally designated by reference numeral 25 in the form of an embossment as disclosed in U.S. Pat. No. 3,402,486;

FIGS. 5 and 6 are cross-sectional views taken along lines 5—5 and 6—6 of FIG. 4;

FIG. 7 is a partial perspective view similar to FIG. 4 and illustrating a reinforcing groove 25' in the form of an indentation as also disclosed in U.S. Pat. No. 3,402,436;

FIG. 8 is a cross-sectional view taken along line 8—8 of FIG. 7;

FIG. 9 is a partial perspective view illustrating a so-called "Oetiker" ear generally designated by reference numeral 120 with a reinforcing depression generally designated by reference numeral 125 of substantially rectangular shape with a substantially flat bottom as disclosed in U.S. Pat. No. 5,282,295;

DETAILED DESCRIPTION OF THE DRAWINGS

Figure 11:
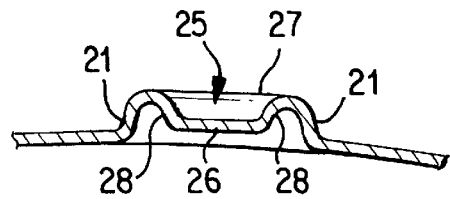
FIGS. 11 and 12 are cross-sectional views taken along lines 11—11 and 12—12 of FIG. 10.
Figure 10:
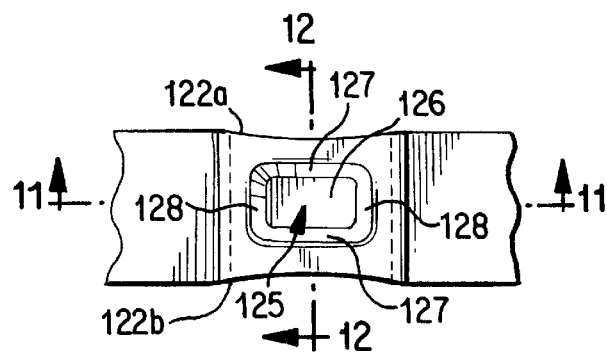
FIG. 10 is a partial top plan view of the reinforcing recess 125 of FIG. 9.
Figure 12:
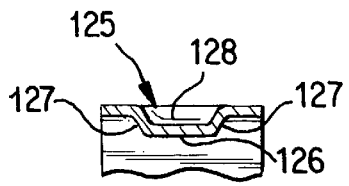
Figure 13:
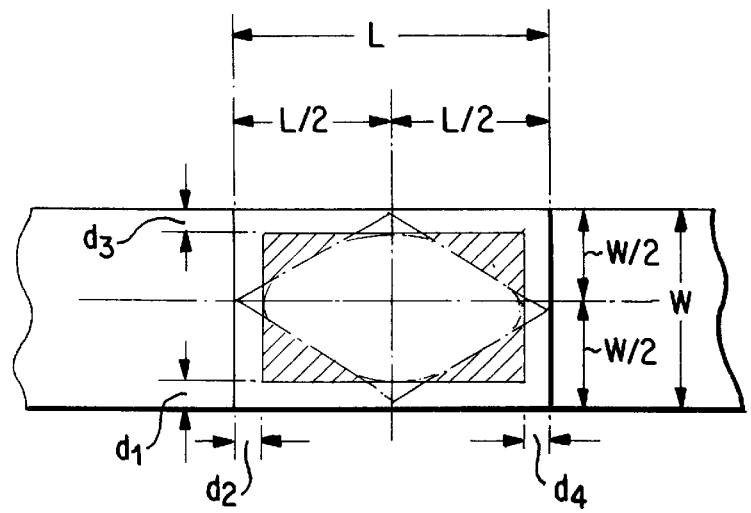
FIG. 13 is a somewhat schematic partial plan view on a bridging portion of an "Oetiker" ear provided with a reinforcing arrangement according to this invention to explain the geometric features thereof.

Referring now to the drawing wherein like reference numerals of the 200 and 300 series are used in the various views thereof to designate like parts, and more particularly to FIG. 13, the length of the bridging portion in this embodiment is assumed to be L and the width of the clamping band to be W. The maximum true diamond shape with four sides would have sides that extend from respective points of W/2 to a respective point of L/2. The area of such a theoretical maximum four-sided diamond would be one-half the area of the bridging portion as the four sides cut in half each of the four rectangles formed by the intersection of the longitudinal center plane and the transverse center place which constitute the entire area of the bridging portion. Assuming additionally that a margin with a width d is left on all four sides of the diamond corresponding, for example, to the margins in the reinforcing arrangement of FIGS. 9 through 12, the area of the remaining bridging portion is greater than 50% of the area of the original bridging portion owing to the rounded-off ends of the sides of the diamond; normally this area is at least 55% of the original portion, and preferably about 55% to about 70% of the original bridging portion. The cross-hatched area in FIG. 13 illustrates the additional material areas which do not partake in the formation of the reinforcing recess and which are now available for plastic deformation into the omega shape of the ear as the corners of the connections between the leg portions and the bridging portion are deformed into corresponding parts of the omega shape.

Figure 14:
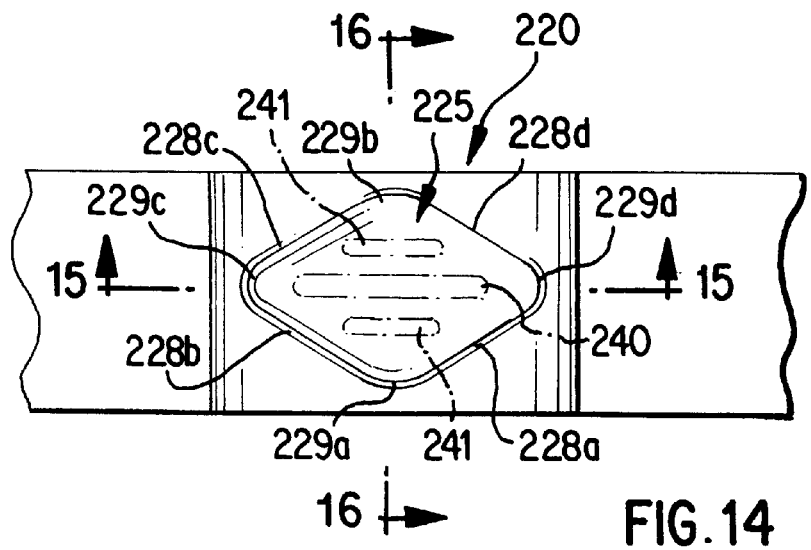
FIG. 14 is a partial plan view on an "Oetiker" ear with a bridging portion provided with a reinforcing arrangement according to this invention.

FIG. 14 illustrates a reinforcing arrangement in the form of a recess defining the outlines of a shape resembling a diamond whose four sides 222a, 222b, 222c and 222d are substantially rectilinear. However, these sides may also be slightly curved either convexly or concavely as desired to increase or decrease the area of the reinforcing recess provided that the radius of curvature is large, at least about two times the length of the bridging portion and preferably about 2.5 to about 4 times the length of the bridging portion. The intersection of the sides of the diamond are rounded-off at 229a, 229b, 229c and 229d, whereby the radius of curvature of the rounded-off portions 229a and 229b is larger than the radius of curvature 229c and 229d. The ratio of the radius of curvature of the rounded-off portions 229a and 229b to the radius of curvature of the rounded-off portions 229c and 229d may thereby be at a ratio of the order of length L to width W of the bridging portion. However, these rounded-off potions may also be formed with a different ratio of their radii of curvature and may also be formed with non-constant radii of curvature as determined empirically for optimum operation. These curved portions 229a–229d are thereby so arranged as to leave a minimum spacing d between the transverse ends and the sides of the bridging portion, on the one hand, and the points of the curved portions most closely approaching the transverse ends and the sides of the bridging portion, on the other. This distance d may be determined empirically to optimize the performance of the reinforcing arrangement according to this invention depending on the size of the clamp, i.e., the size of the length and width of the bridging portion and the type of material and its thickness used with a given clamp. The bottom 226 is substantially flat but may also be curved slightly convexly or concavely, provided the slight curvature is formed with a radius of curvature at least about 2.5 and preferably about 3 to 5 times the length of the bridging portion.

The angle α formed by each of the longitudinal and transverse sides 220a through 220d including also the rounded-off portions 229a through 229d with the plane of the bridging portion and the plane of the bottom part 226 is greater than about 45° and preferably between about 55° and about 70° and the connections of the sides 220a–220d with the remaining bridging portion and the bottom part 226 are rounded off with a small radius of curvature. To further strengthen the resistance to buckling, the reinforcing arrangement according to this invention may include an additional reinforcing recess in the form of a narrow pressed-out and deep-drawn groove 240 in the center longitudinal plane of the approximately diamond-shaped reinforcing arrangement. If the width of the clamping band permits, i.e., for example, with a width of the clamping band of 7 mm, 9 mm or more, the reinforcing groove 240 may be adjoined by one or more reinforcing grooves 241 on each side of the groove 240. The length of each additional groove thereby decreases in its overall length so as to conform substantially to the outline of a four-sided diamond.

Figure 15:
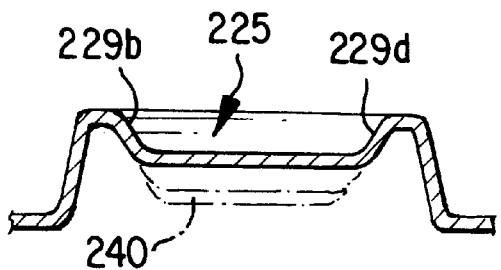
FIGS. 15 an 16 are cross-sectional views taken along lines 15—15 and 16—16 of FIG. 14.
Figure 16:
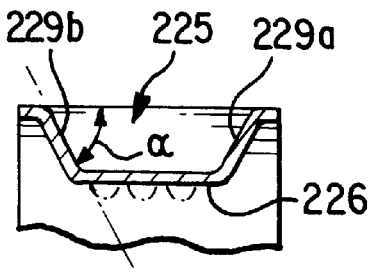

The depth of the recess 225 can be determined empirically in order to optimize conditions for a given clamp size made from a given type of material. However, as a rule of thumb, this depth may be about 0.08 to about 0.2 times the height of the ear, preferably from about 0.1 to about 0.175 times the height of the ear. The depth of any additional groove-shaped reinforcing recess 240, 241 should be no more than the depth of the recess 225 and preferably from about 0.4 to about 0.8 the depth of the recess 225. The width of any additional reinforcing groove 240, 241 again depends on the width of the clamping band and on the type of material used, i.e., on the available space in the transverse direction of the clamping band, and may be from about 0.7 to about 1.3 mm. The bottom of each such reinforcing groove is thereby rounded off and passes over into the substantially flat bottom 226 of the recess 225 by rounded-off sections of small radius of curvature. The length of the groove-shaped reinforcing recess 240 again can be determined empirically for a given clamp size and given clamp material, but may be of the order of about 0.6 to about the full length of the maximum dimension in the longitudinal direction of the recess 225. In the latter case, its connecting end wall may be integrated with the wall connecting the recess 225 with the remaining bridging portion, as indicated in dash-and-dotted lines in FIG. 15. The groove-shaped reinforcing recesses 240 and 241 are shown in dash-and-dotted lines in FIGS. 14, 15 and 16.

Figure 17:
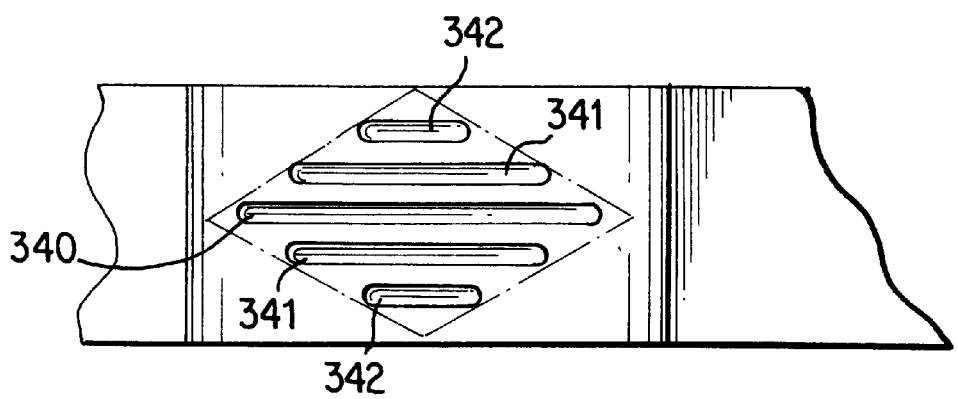
FIG. 17 is a partial top plan view, similar to FIG. 14, and illustrating a modified embodiment of a reinforcing arrangement according to this invention in the bridging portion of an "Oetiker" ear.

With certain band materials having a certain strength and/or thickness that are also of greater width, such as of 7 mm or 9 mm width, the diamond-shaped recess 225 may be omitted altogether, while the groove-shaped reinforcing recesses 340, 341 and 342 then assume by themselves the function of preventing buckling of the ear during plastic deformation. As shown in FIG. 17, the grooves 340, 341 and 342 then are of such length as to substantially confirm the outline of the four-sided diamond of FIG. 14. The dimensions of grooves 340, 341 and 342 thereby conform to what was said in connection with grooves 240 and 241 insofar as length and width are concerned. However, the depth of grooves 340, 341 and 342 will then preferably conform to the depth indicated above for recess 225. Again, optimum dimensions can be empirically determined for a clamp of a given size and made from a given material. Additionally, in both the embodiments of FIGS. 14 and 17, the additional grooves 241 and 341, 342, respectively, may be made also of successively smaller width and depth so as to produce optimum results for a given clamp size made from a given material. The dimensions d1, d2, d3 and d4 may be the same and may also be determined empirically for best results. Again, as a rule of thumb, these dimensions d1, d2, d3 and d4 are each between about 0.03 to about 0.1 times the width and length of the bridging portion, preferably between about 0.05 to about 0.08 times the width and length of the bridging portion, respectively. However, the dimensions d1 and d3 may also be smaller than the dimensions d2 and d4 within the ranges given above, for example, by a ratio of width over length of the bridging portion.

The four-sided approximately diamond-shaped reinforcing arrangement in the bridging portion according to this invention conforms more closely to the need of increasing resistance to buckling required from each longitudinal end of the bridging portion toward the center and increases substantially linearly with straight sides of the approximately diamond-shaped recess. To the extent the necessary increase in resistance to buckling is not exactly linear from each end to the center of the bridging portion, the sides 228a through 228d may be slightly curved to more closely coincide with the required increase in resistance to buckling in a given bridging portion, bearing in mind the minimum radii of curvature indicated above. The reinforcing arrangement according to this invention also permits a ready adjustment of the dimensions thereof to the needs in a given clamp by changing in particular the dimensions d1–d4 which can be readily achieved by minor changes in the tools.

While I have shown and described several embodiments in accordance with the present invention, it is understood that the same is not limited thereto but is susceptible of numerous changes and modifications as known to those skilled in the art. For example, the reinforcing arrangement of this invention is also of particular usefulness with plastically deformable ears in which the generally outwardly extending leg portions do not form an angle of 90° with the bridging portion but diverge from one another inwardly from their connection with the bridging portion, as more fully described in the copending application Ser. No. 09/504, 850, filed on Feb. 16, 2000, the entire subject matter of which is incorporated herein by reference. I therefore do not wish to be limited to the details shown and described herein but intend to cover all such changes and modifications as are encompassed by the scope of the appended claims.

What is claimed is:

1. A reinforcing arrangement for a plastically deformable ear for use in a hose clamp, said plastically deformable ear having two leg portions interconnected by a bridging portion provided with reinforcing means, said reinforcing means being in the form of deep-drawn recess means pressed-out of said bridging portion and confirming the outlines resembling a four-sided diamond.

2. A reinforcing arrangement according to claim 1, wherein the outlines of the reinforcing means are formed by a deep-drawn, pan-shaped depression with a bottom portion at least nearly flat and passing over into the remaining original bridging portion by way of side portions.

3. A reinforcing arrangement according to claim 2, wherein the imaginary intersection of the sides of the diamond are replaced by rounded-off portions.

4. A reinforcing arrangement according to claim 3, wherein the side portions form an angle with the plane of the bridging portion larger than about 60°.

5. A reinforcing arrangement according to claim 4, wherein said angle is of the order of about 65° to about 80°.

6. A reinforcing arrangement according to claim 4, wherein said side portions pass over into the plane of said bridging portion and into the plane of said bottom portion by way of rounded-off portions.

7. A reinforcing arrangement according to claim 1, wherein the depth of the reinforcing means is between about 0.05 mm to about 0.175 mm, preferably about 0.08 to about 0.2 times the height of the plastically deformable ear means.

8. A reinforcing arrangement according to claim 1, wherein the sides of the diamond are substantially straight.

9. A reinforcing arrangement according to claim 1, wherein the sides of the diamond are curved with a radius of curvature at least about two times the length of the bridging portion in the longitudinal direction.

10. A reinforcing arrangement according to claim 9, wherein said radius of curvature is between about 2.5 to about 4 times the length of the bridging portion in the longitudinal direction.

11. A reinforcing arrangement according to claim 1, further comprising additional reinforcing means including at least one narrow deep-drawn groove-shaped reinforcing recess extending substantially in the longitudinal center of said depression means.

12. A reinforcing arrangement according to claim 11, wherein said additional reinforcing means includes, in addition to said at least one groove-shaped recess, at least one further narrow deep-drawn groove-shaped recess on each side of said at least one groove-shaped recess.

13. A reinforcing arrangement according to claim 12, wherein each further groove-shaped recess is shorter than said at least one groove-shaped recess.

14. A reinforcing arrangement according to claim 11, wherein said additional reinforcing means includes, in addition to said at least one groove-shaped recess, several further groove-shaped recesses on each side of said at least one groove-shaped recess, and each further groove-shaped recess decreasing in length in a transverse direction away from said at least one groove-shaped recess.

15. A reinforcing arrangement according to claim 14, wherein each additional reinforcing means has a depth of about 0.4 to about 0.8 times the depth of the recess.

16. A reinforcing arrangement according to claim 1, wherein several side-by-side deep-drawn groove-shaped reinforcing means arranged in a transverse direction of the bridging portion and of ever decreasing length relative to the center longitudinal plane of said bridging portion define the outlines resembling a four-sided diamond.

17. A clamp, comprising clamping band means including plastically deformable ear-like tightening means, said ear-like tightening means being formed by two generally outwardly extending leg portions interconnected by a bridging portion provided with reinforcing means, and said reinforcing means having a shape confirming the outlines resembling a four-sided diamond.

18. A clamp according to claim 17, wherein the intersections of the sides of the diamond are replaced by rounded-off portions.

19. A clamp according to claim 17, wherein the outlines of the reinforcing means are formed by a deep-drawn shallow depression with a bottom portion at least nearly flat and passing over into the remaining original bridging portion by way of side portions.

20. A clamp according to claim 19, wherein the depth of the reinforcing means is between about 0.075 mm to about 0.25 mm.

21. A clamp according to claim 19, wherein the sides of the diamond at most differ from a rectilinear shape by a curvature with a radius of curvature greater than at least about 2.5 times the length of the bridging portion in the longitudinal direction.

22. A clamp according to claim 19, further comprising additional reinforcing means including at least one narrow deep-drawn groove-shaped reinforcing recess extending substantially in the longitudinal center of said depression means.

23. A clamp according to claim 22, wherein said additional reinforcing means includes, in addition to said at least one groove-shaped recess, at least one further narrow deep-drawn groove-shaped recess on each side of said at least one groove-shaped recess.

24. A clamp according to claim 23, wherein each further groove-shaped recess is shorter than said at least one groove-shaped recess.

25. A clamp according to claim 22, wherein said additional reinforcing means includes, in addition to said at least one groove-shaped recess, several further groove-shaped recesses on each side of said at least one groove-shaped recess, and wherein each further groove-shaped recess decreases in length in a transverse direction away from said at least one groove-shaped recess.

26. A clamp according to claim 17, wherein said reinforcing means includes several side-by-side groove-shaped reinforcing grooves arranged in a transverse direction of the bridging portion and of ever decreasing length relative to the center longitudinal plane of said bridging portion which define the outlines resembling a four-sided diamond.

* * * * *